United States Patent
Williams et al.

(10) Patent No.: US 12,286,931 B2
(45) Date of Patent: *Apr. 29, 2025

(54) VARIABLE RESTRICTION OF A FUEL CIRCUIT OF A FUEL NOZZLE

(71) Applicant: Collins Engine Nozzles, Inc., Des Moines, IA (US)

(72) Inventors: Brandon P. Williams, Johnston, IA (US); Murtuza Lokhandwalla, South Windsor, CT (US); Michael Ferrarotti, Durham, CT (US); Todd Haugsjaahabink, Amherst, MA (US); Russell P. Rourke, Jr., East Granby, CT (US); Jay W. Kokas, Bloomfield, CT (US); Richard E. Versailles, New Hartford, CT (US); Jason A. Ryon, Carlisle, IA (US); Charles E. Reuter, Granby, CT (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,753

(22) Filed: Jul. 21, 2023

(65) Prior Publication Data

US 2024/0068407 A1   Feb. 29, 2024

Related U.S. Application Data

(63) Continuation-in-part of application No. 17/896,762, filed on Aug. 26, 2022, now Pat. No. 11,913,382.

(51) Int. Cl.
*F02C 7/232* (2006.01)
*F02C 7/228* (2006.01)
(Continued)

(52) U.S. Cl.
CPC .............. *F02C 7/232* (2013.01); *F02C 7/228* (2013.01); *F02C 9/34* (2013.01); *F23D 14/48* (2013.01); *F23R 3/346* (2013.01); *F23R 3/36* (2013.01)

(58) Field of Classification Search
CPC .... F23R 3/28; F23R 3/34; F23R 3/343; F23R 3/346; F02C 9/26; F02C 9/263;
(Continued)

(56) References Cited

U.S. PATENT DOCUMENTS 3,728,859 A   4/1973 Seiler
4,655,912 A   4/1987 Bradley et al.
(Continued)

FOREIGN PATENT DOCUMENTS

EP   3767091 A1   1/2021
FR   3103522 A1 * 5/2021 .............. F02C 7/232

OTHER PUBLICATIONS

Extended European Search Report dated Jan. 26, 2024, for corresponding European Patent Application No. 23193755.8.
(Continued)

*Primary Examiner* — Alain Chau
(74) *Attorney, Agent, or Firm* — Kinney & Lange, P.A.

(57) ABSTRACT

A fuel injector for a turbine engine includes a fuel scheduling valve configured for regulation of fuel flow from a fuel inlet in response to fuel pressure received at the fuel inlet. Primary and secondary fuel circuits receive fuel from the scheduling valve, and an electrically-controlled valve is provided in fluid communication with the primary circuit, adapted and configured to actively control fuel through the primary circuit in response to a control signal.

20 Claims, 4 Drawing Sheets

(51) Int. Cl.
*F02C 9/34* (2006.01)
*F23D 14/48* (2006.01)
*F23R 3/34* (2006.01)
*F23R 3/36* (2006.01)

(58) Field of Classification Search
CPC .... F02C 9/32; F02C 7/22; F02C 7/222; F02C 7/232; F23N 1/005
See application file for complete search history.

(56) References Cited

U.S. PATENT DOCUMENTS

| | | |
|---|---|---|
| 4,726,396 A | 2/1988 | Bradley et al. |
| 4,817,375 A | 4/1989 | Brocard et al. |
| 4,817,389 A | 4/1989 | Holladay et al. |
| 4,962,887 A | 10/1990 | Matsuoka |
| 5,257,502 A | 11/1993 | Napoli |
| 5,339,636 A | 8/1994 | Donnelly et al. |
| 5,406,798 A | 4/1995 | Wiesner, Jr. |
| 5,417,054 A | 5/1995 | Lee et al. |
| 5,568,721 A | 10/1996 | Alary et al. |
| 5,732,730 A | 3/1998 | Shoemaker et al. |
| 5,735,117 A | 4/1998 | Toelle |
| 6,003,781 A | 12/1999 | Kwan |
| 6,119,960 A | 9/2000 | Graves |
| 6,314,717 B1 | 11/2001 | Teets et al. |
| 6,351,948 B1 | 3/2002 | Goeddeke |
| 6,357,237 B1 | 3/2002 | Candy et al. |
| 7,255,290 B2 | 8/2007 | Bright et al. |
| 7,841,184 B2 * | 11/2010 | Dooley ............... F23N 5/184 60/776 |
| 8,316,630 B2 | 11/2012 | Futa et al. |
| 8,347,599 B2 | 1/2013 | Scully |
| 8,387,400 B2 | 3/2013 | Goeke et al. |
| 8,438,851 B1 | 5/2013 | Uhm et al. |
| 8,483,931 B2 | 7/2013 | Williams et al. |
| 8,666,632 B2 | 3/2014 | Zebrowski et al. |
| 8,677,754 B2 | 3/2014 | Lueck et al. |
| 8,807,463 B1 | 8/2014 | McAlister |
| 8,820,087 B2 | 9/2014 | Ryan |
| 9,121,349 B2 | 9/2015 | Griffiths et al. |
| 9,234,465 B2 | 1/2016 | Futa et al. |
| 9,488,107 B2 | 11/2016 | Rodrigues et al. |
| 9,494,079 B2 | 11/2016 | Pousseo et al. |
| 9,840,992 B2 | 12/2017 | Duncan et al. |
| 10,041,411 B2 | 8/2018 | Chabaille et al. |
| 10,174,948 B2 | 1/2019 | Hill |
| 10,288,294 B2 | 5/2019 | Griffiths et al. |
| 10,408,131 B2 | 9/2019 | Thompson et al. |
| 10,465,908 B2 | 11/2019 | Stevenson et al. |
| 10,487,957 B2 | 11/2019 | Bleeker et al. |
| 10,502,138 B2 | 12/2019 | Reuter et al. |
| 10,982,858 B2 | 4/2021 | Bickley |
| 11,067,278 B2 | 7/2021 | Prociw et al. |
| 11,215,121 B2 | 1/2022 | Stevenson |
| 11,371,439 B2 | 6/2022 | Di Martino et al. |
| 11,408,347 B2 | 8/2022 | Reuter et al. |
| 11,408,348 B2 | 8/2022 | Culwick |
| 11,421,600 B1 | 8/2022 | Reuter et al. |
| 11,549,687 B2 | 1/2023 | Griffiths et al. |
| 11,643,970 B2 | 5/2023 | Baker et al. |
| 11,913,381 B1 | 2/2024 | Williams et al. |
| 11,970,976 B2 | 4/2024 | Lokhandwalla et al. |
| 11,970,977 B2 | 4/2024 | Lokhandwalla et al. |
| 12,060,831 B1 | 8/2024 | Williams et al. |
| 2003/0093998 A1 | 5/2003 | Michau et al. |
| 2005/0224598 A1 | 10/2005 | Potz et al. |
| 2006/0144964 A1 | 7/2006 | Boecking |
| 2006/0236974 A1 | 10/2006 | Randall |
| 2008/0256954 A1 * | 10/2008 | Dooley ................. F23R 3/343 60/733 |
| 2008/0309261 A1 | 12/2008 | Anson |
| 2009/0077945 A1 | 3/2009 | Cornwell et al. |
| 2009/0173810 A1 | 7/2009 | Rodrigues et al. |
| 2009/0204306 A1 | 8/2009 | Goeke et al. |
| 2009/0234555 A1 | 9/2009 | Williams et al. |
| 2009/0277185 A1 | 11/2009 | Goeke et al. |
| 2010/0005776 A1 | 1/2010 | Lueck et al. |
| 2010/0037615 A1 | 2/2010 | Williams et al. |
| 2010/0050593 A1 | 3/2010 | Futa et al. |
| 2010/0058770 A1 | 3/2010 | Ryan |
| 2012/0198852 A1 | 8/2012 | Hernandez et al. |
| 2012/0261000 A1 | 10/2012 | Futa et al. |
| 2013/0042920 A1 | 2/2013 | Snodgrass et al. |
| 2013/0061599 A1 | 3/2013 | Van Alen |
| 2014/0034023 A1 | 2/2014 | Coldren |
| 2014/0311455 A1 | 10/2014 | Kim et al. |
| 2015/0096301 A1 | 4/2015 | Chabaille et al. |
| 2015/0292412 A1 | 10/2015 | Rodrigues et al. |
| 2016/0017808 A1 | 1/2016 | Chabaille et al. |
| 2016/0230904 A1 | 8/2016 | Zarrabi et al. |
| 2016/0245524 A1 | 8/2016 | Hill |
| 2016/0298851 A1 | 10/2016 | Brickwood et al. |
| 2017/0268781 A1 | 9/2017 | Stevenson et al. |
| 2018/0066588 A1 | 3/2018 | Daly et al. |
| 2018/0066591 A1 | 3/2018 | Ozzello et al. |
| 2018/0163635 A1 | 6/2018 | Marocchini et al. |
| 2018/0163637 A1 | 6/2018 | Griffiths |
| 2018/0163966 A1 | 6/2018 | Jones et al. |
| 2018/0291831 A1 | 10/2018 | Hirano |
| 2018/0372321 A1 | 12/2018 | Yates et al. |
| 2018/0372323 A1 | 12/2018 | Griffiths |
| 2020/0102888 A1 * | 4/2020 | Stevenson ............... F02C 7/232 |
| 2021/0017908 A1 | 1/2021 | Di Martino et al. |
| 2021/0018177 A1 | 1/2021 | Griffiths et al. |
| 2022/0364658 A1 | 11/2022 | Shelby et al. |
| 2023/0015929 A1 * | 1/2023 | Smith ..................... F23R 3/343 |
| 2023/0050741 A1 | 2/2023 | Xuening et al. |
| 2023/0175443 A1 | 6/2023 | Bickley |
| 2024/0068412 A1 | 2/2024 | Williams et al. |

OTHER PUBLICATIONS

Extended European Search Report dated Nov. 25, 2024, for corresponding European Patent Application No. 24189906.1.
Final Office Action dated Feb. 3, 2025, for related U.S. Appl. No. 18/109,555, 59 pgs.
Non-Final Office Action dated Jul. 11, 2024, for related U.S. Appl. No. 18/109,555, 42 pgs.
Non-Final Office Action dated May 10, 2024, for related U.S. Appl. No. 18/224,843, 20 pgs.
Non-Final Office Action dated May 10, 2024, for related U.S. Appl. No. 18/224,869, 21 pgs.
Notice of Allowance and Fee(s) Due dated Mar. 7, 2025, for related U.S. Appl. No. 18/224,843, 8 pgs.

* cited by examiner

VARIABLE RESTRICTION OF A FUEL CIRCUIT OF A FUEL NOZZLE

CROSS-REFERENCE TO RELATED APPLICATIONS

This is a continuation-in-part of U.S. patent application Ser. No. 17/896,762 filed Aug. 26, 2022, the content of which is incorporated herein in its entirety.

BACKGROUND

Field of the Invention

The present invention relates to fuel control and delivery systems of turbine engines, particularly to fuel injectors and nozzles, such as those found in commercial aircraft.

Description of the Related Art

Turbine fuel control systems, such as those typically found in commercial aircraft include various robust controls to allow for optimized operational characteristics under different load conditions.

Often, a mechanical fuel metering or "scheduling" valve is provided in connection with a fuel injector and serves to respond to an increase in fuel pressure supplied to it by gradually opening one or more flow paths, such as to a primary and/or secondary fuel injector nozzle. A resistive spring provides the force balance to limit the rate at which the scheduling valve opens. These valves can be used to divide flow as well, providing multiple flow paths that can be sequenced/scheduled based on inlet fuel pressure, valve open area, and any downstream flow devices such as atomizers. At relatively low flow conditions, the flow scheduling valve is largely responsible for most of the metering and therefore consumes/requires the majority of the fuel pressure. At relatively high flow conditions, there is a transition of pressure drop from the valve to other components downstream of the valve. One such fuel scheduling valve is described in U.S. Pat. No. 5,732,730 to Shoemaker, et al., which reference is incorporated herein by reference in its entirety.

Gas turbine combustors will typically have a natural frequency that may become excited when a certain heat release is attained. Quite often, this phenomenon occurs at ground conditions, however, it can also be a concern at multiple flow conditions. This condition can cause significant levels of noise and occasionally may negatively impact the health of the structural components within and around the combustor. To mitigate this noise, adjustments to fuel scheduling may be directed, in an attempt to decouple the heat release and noise, however, these attempts require additional flow dividing hardware and fuel manifolds, adding significant cost, weight, and power requirements.

Alternative fuel distribution systems also exist in the art that include a common fuel dividing valve, which distributes supplied fuel to separate manifolds, each manifold independently delivering a supply of fuel to separate fuel circuits of multiple injectors.

Although generally considered satisfactory, such aforementioned arrangements do not allow for active or granular control of injectors, which can lead to suboptimal performance and/or undesirable operational characteristics under certain operating conditions. Applicant recognizes, therefore, an ever present need for improved systems and methods for adjusting flow in passive injection valves.

SUMMARY

In accordance with a first aspect of the invention, a fuel injector for a turbine engine is provided, which includes a housing having an internal enclosure for pressurized fluid, a fuel inlet formed on the housing, permitting delivery of fuel supply to the fuel injector, a scheduling valve disposed within the housing, configured for regulation of fuel flow from the fuel inlet in response to fuel pressure received at the fuel inlet, a primary fuel circuit formed in the housing, receiving fuel from the scheduling valve, a secondary fuel circuit formed in the housing, receiving fuel from the scheduling valve, an electrically-controlled valve in fluid communication with the primary circuit adapted and configured to actively control fuel through the primary circuit in response to a control signal, a fuel nozzle in fluid communication with, receiving fuel from the primary and secondary fuel circuits, a primary outlet formed on the nozzle, in fluid communication with the primary fuel circuit, and a secondary outlet formed on the nozzle, in fluid communication with the secondary fuel circuit.

The electrically-controlled valve can be a discrete open/closed valve. It is also contemplated that the electrically-controlled valve can be a proportional valve with intermediate conditions between fully open and fully closed. The proportional valve can include a proportional solenoid or a stepper motor.

The scheduling valve can include a movable valve member or "spool," biased to a closed position by one or more biasing members, wherein the valve spool is configured to regulate flow from the inlet of the injector to each of the primary and secondary circuits, and wherein the valve spool includes a scheduling surface configured to vary flow area through the secondary fuel circuit based on position of the valve spool within the scheduling valve.

A leak path can be provided in connection with the primary fuel circuit, whereby fuel from the scheduling valve passes through the primary fuel circuit at a minimum predetermined rate when dictated by the scheduling valve, regardless of the operation of the electrically-controlled valve. The leak path can be formed in the housing, parallel to a fluid path through the electrically-controlled valve. Alternatively, the leak path can provided by the electrically-controlled valve itself. The leak path can be defined by a default valve position of the electrically-controlled valve. Activation of the electrically-controlled valve can increase fluid flow through the primary fuel circuit.

The electrically-controlled valve can be a binary valve. Alternatively, the electrically-controlled valve can be a modulating valve. Alternatively still, the electrically-controlled valve can be a motorized valve.

In accordance with a further aspect of the invention, a fuel supply system for a turbine engine is provided, including a single fuel manifold adapted to receive and distribute a fuel supply to a plurality of points of the turbine engine, and a plurality of fuel injectors distributed around a periphery of the engine, adapted and configured to receive fuel from the single fuel manifold. In accordance with this aspect, at least one of the fuel injectors has a housing having an internal enclosure for pressurized fluid, a fuel inlet formed on the housing, permitting delivery of fuel supply from the single fuel manifold to the fuel injector, a scheduling valve disposed within the housing, configured for regulation of fuel flow from the fuel inlet in response to fuel pressure received at the fuel inlet, a primary fuel circuit formed in the housing, receiving fuel from the scheduling valve, a secondary fuel circuit formed in the housing, receiving fuel from the scheduling valve, an electrically-controlled valve in fluid communication with the primary circuit adapted and configured to actively control fuel through primary circuit in response to a control signal, a fuel nozzle in fluid communication with and receiving fuel from the primary and secondary fuel circuits, a primary outlet formed on the nozzle, in fluid communication with the primary fuel circuit, and a secondary outlet formed on the nozzle, in fluid communication with the secondary fuel circuit.

The electrically-controlled valve can be a discrete open/closed valve. The electrically-controlled valve can be a proportional valve with intermediate conditions between fully open and fully closed. The proportional valve can include a proportional solenoid or a stepper motor.

The system can further include at least one passive fuel injector, receiving fuel from the single fuel manifold. The at least one passive fuel injector can include only one nozzle. The system can further include a metering valve adapted and configured to receive a fuel supply from a fuel pump, and output the fuel to the single manifold. The system can further include a controller electrically connected to the electrically-controlled valve on at least one fuel injector for individual control thereof. The system can further include a controller electrically connected to the electrically-controlled valves on a plurality of fuel injectors for ganged control thereof. Each of the injectors in the plurality of fuel injectors can include a mass flow sensor operatively connected to the controller to provide mass flow feedback to the controller.

These and other features of the devices, systems and related methods of the subject disclosure will become more readily apparent to those skilled in the art, from the following detailed description of the preferred embodiments taken in conjunction with the drawings.

BRIEF DESCRIPTION OF THE DRAWINGS

So that those skilled in the art to which the subject disclosure appertains will readily understand how to make and use the devices, systems and related methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
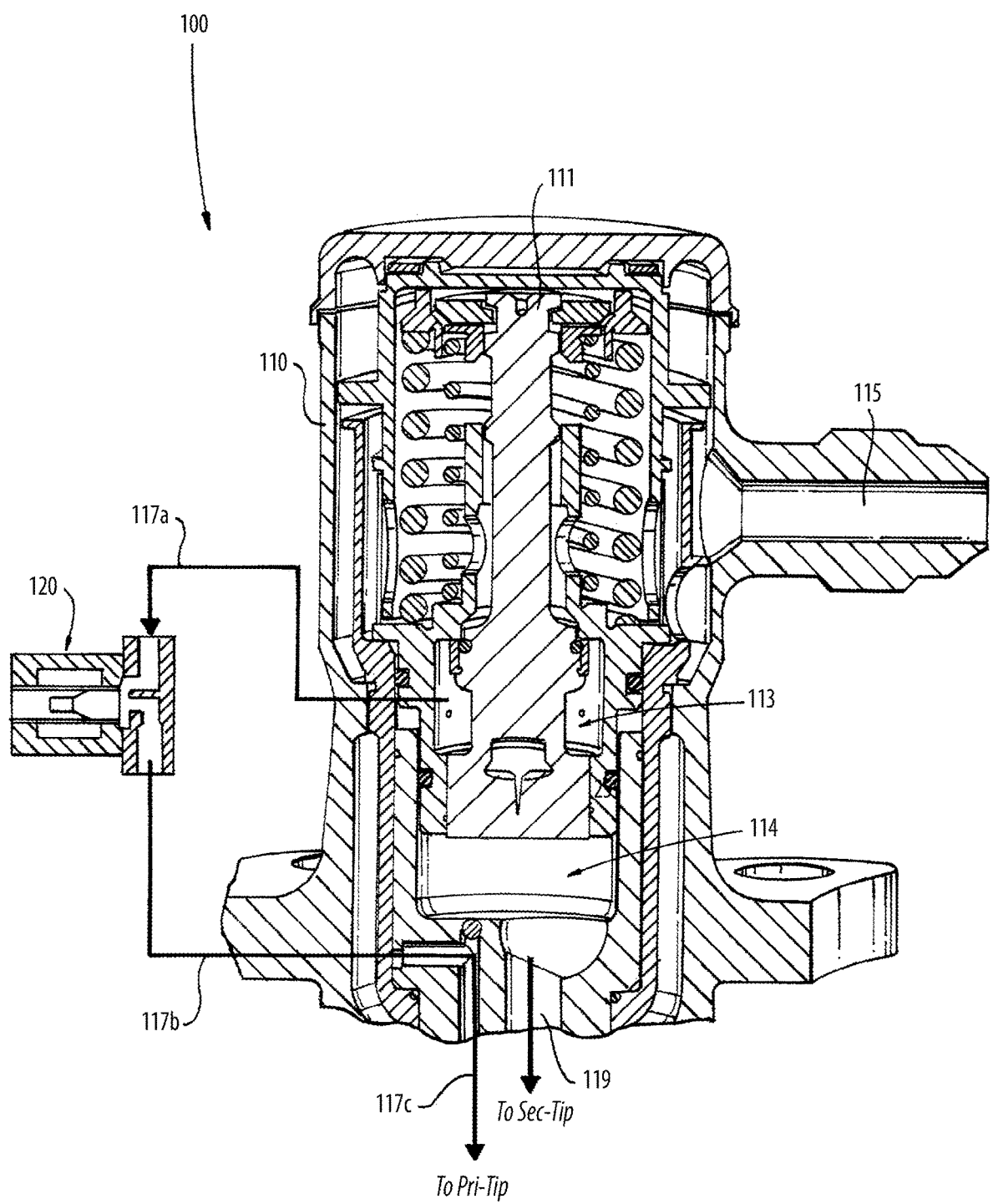
FIG. 1 is a schematic cross-sectional perspective view of a valve arrangement for a fuel injector in accordance with one aspect of the present invention.

Reference will now be made to the drawings wherein like reference numerals identify similar structural features or aspects of the subject disclosure. For purposes of explanation and illustration, and not limitation, representative embodiments and aspects of the subject devices, systems and related methods are described. The devices, systems and methods described herein can be used to provide adjustment to fuel flow through otherwise passive valves, e.g. to control emissions, mitigate flame-out risk and/or to provide active patternation in fuel injection for gas turbine engines.

With reference to FIG. 1, there is illustrated a schematic cross-sectional perspective view of a valve arrangement 100 for a fuel injector in accordance with one aspect of the present invention. The valve 100 includes a housing 110, a fuel inlet 115, and a movable valve member or spool 111, which is fitted inside the housing 110, and resiliently urged into a normally closed position, unless acted on by sufficient inlet fuel pressure to overcome the biasing force(s). When experiencing increased fuel pressure of at least a predetermined value, the spool 111 is urged downward, allowing fuel to pass into a primary outlet chamber 113. Fuel is thus supplied to a primary fuel circuit 117a, 117b, 117c.

An electrically-controlled, valve 120 is provided in the primary fuel circuit 117 to enable active adjustment of fuel flowing through the primary fuel circuit 117. Depending on the implementation, the electrically-controlled valve 120 can be formed integrally with the housing 110, or separately attached thereto.

Under default operating conditions, a predetermined amount of fuel is permitted to flow through the primary fuel circuit 117, without active intervention by the electrically-controlled valve 120. That is, a leak path is provided for some fuel to flow through the primary fuel circuit 117, past the electrically-controlled valve 120, and in this manner, the benefits of a fail-safe configuration are achieved. Such leak path can be provided by forming a bypass channel around or through the electrically-controlled valve 120, or alternatively by configuring the electrically-controlled valve 120 so as to always be partially open.

If higher fuel pressure is applied via fuel inlet 115, such as when higher power output is required, the spool 111 is urged further downward, opening a path for fuel to enter a secondary fuel outlet chamber 114, and thus also a secondary fuel circuit 119. The primary fuel circuit 117 and secondary fuel circuit 119, continue to deliver fuel to respective primary and secondary fuel nozzles of an associated fuel injector. In alternate implementations, the same valve arrangement 100 can be used in conjunction with multiple injectors simultaneously.

As such, the valve arrangement 100, including electrically-controlled valve 120 on the primary fuel circuit, permits active control of fuel flow rate through the primary fuel circuit at levels above a default, predetermined flow rate. Such control may be desirable in order to change the characteristics of the fuel being injected into the combustor of the turbine engine in order to control emissions, or mitigate the potential for flame-out.

Advantageously, because active control is only provided for flow rates above a base flow rate, weight is minimized, because a smaller valve operator is needed than would be required for full electric fuel control. Also for this reason and because use of active control will typically be limited to certain operating conditions, any additional electrical power requirements are also minimized, along with associated heat generation.

The electrically-controlled valve 120 can be of any suitable type, as may be dictated by the desired implementation. Suitable valves can be of solenoid-operated type, or those utilizing electroactive (e.g. piezoelectric) materials, such as those described by U.S. Patent Publication No. 2016/0230904 to Zarrabi et al., which is incorporated herein by reference in its entirety. Alternatively, proportional or modulating operators can be utilized, such as by use of a stepper-motor actuator, as well as 3-way solenoid valves or magnetorestrictive valves.

Figure 2:
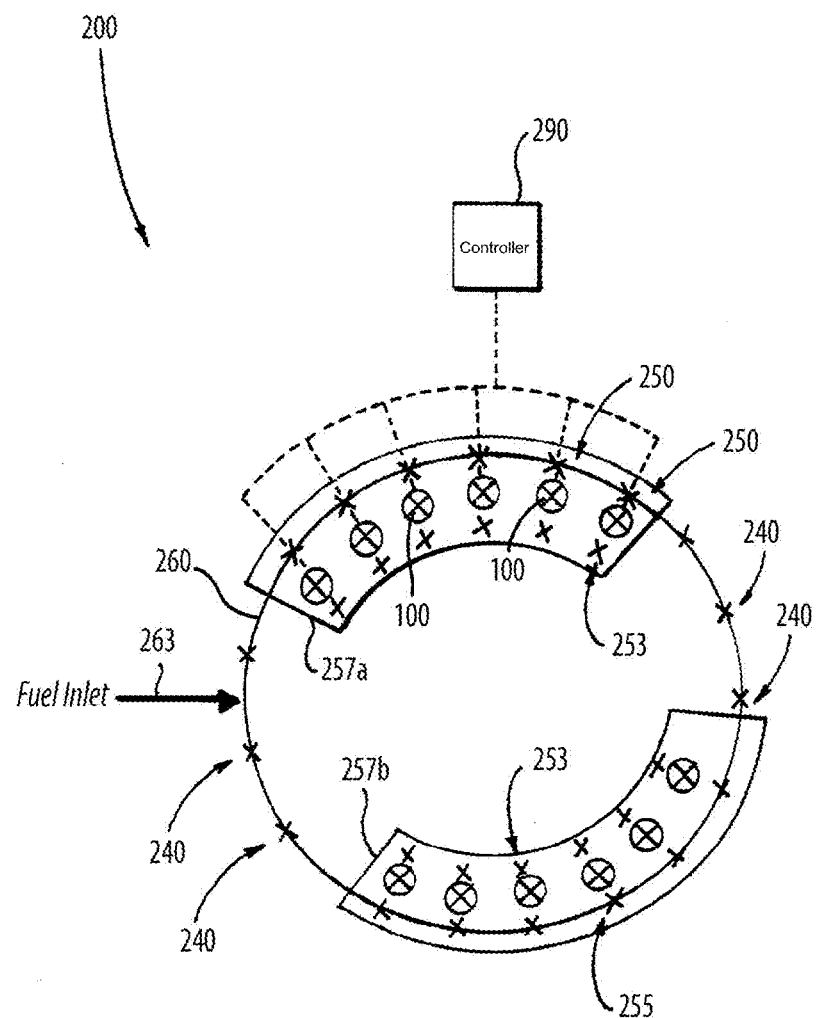
FIG. 2 is a schematic diagram of a fuel supply system for a jet turbine engine in accordance with a further aspect of the invention, which includes multiple fuel injectors incorporating the valve arrangement of FIG. 1, along with duplex fuel nozzles.

With reference now to FIG. 2, there is illustrated a fuel supply system 200, which includes a plurality of duplex injectors 250, each with a valve arrangement 100 as shown in FIG. 1. Each duplex injector 250 includes a primary nozzle 253 and a secondary nozzle 255, respectively fed by primary 117 and secondary 119 fuel circuits of the injector, as described above.

In the illustrated embodiment, also illustrated are a plurality of simplex fuel injectors 240, configured so as to act, as secondary nozzles, passively—that is, to become active with other secondary nozzles 255 of the system 200 in response to increased fuel pressure above a predetermined level. The duplex 250 and simplex 240 injectors are connected by way of a single fuel manifold 260, which receives fuel via inlet 263, optionally from a common fuel metering valve.

A controller 290 is also illustrated interfacing with respective valves 100, in order to actively adjust fuel flow, as described above. For the sake of simplicity, electrical connections are only illustrated for a portion of the duplex injectors 250 having electrically-controlled valves 120, however it is to be understood that all active injectors are provided with control. The controller can be configured so as to enable individual control of each electrically-controlled valve 120, or alternatively, can be configured so as to control them in predetermined groupings or in "ganged" fashion. Moreover, multiple controllers can be provided for redundancy, for example As illustrated, a first sub-set of duplex injectors 257a is grouped circumferentially offset from the second sub-set of duplex injectors 257b. In the illustrated embodiment there are also two groups of three passive simplex injectors 240, also separated circumferentially from one another. Those skilled in the art will readily appreciate that this circumferential arrangement can be modified as needed for a given engine application, and that control of the injectors 240, 250 as described herein allows for finely tuned control of the flame in the associated combustor.

Further, the control of electrically-controlled valves 120 can be based on sensor feedback from one or more sensors in the system 200, such as mass flow sensors, pressure sensors and/or valve position sensors, which can allow for health monitoring and active flow control. Moreover, of the actively controlled valves, the controller 290 can control certain valves to have higher flow rates than others. Further, when valves are actuated to increase or reduce fuel flow rates, the valves can be actuated gradually and/or sequentially to minimize sudden pressure fluctuations within the fuel system 200.

Figure 3:
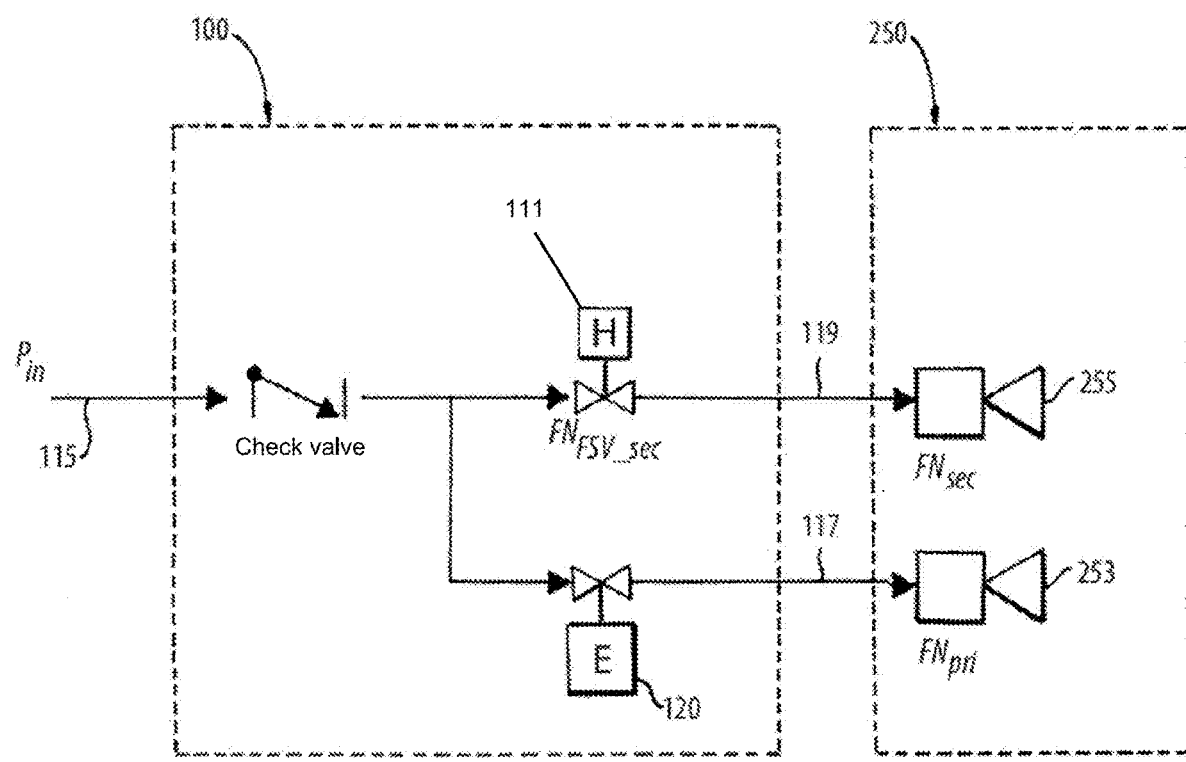
FIG. 3 is a schematic diagram of the valve arrangement of FIG. 1.

FIG. 3 is a schematic diagram of the valve arrangement of FIG. 1, illustrating the functional arrangement of components of the valve 100 and its associated fuel injector 250. Illustrated is the fuel inlet 115, followed by a check function, accomplished by a first open position of the valve spool 111 of FIG. 1. After that, fuel is divided into primary 117 and secondary 119 fuel circuits. The primary fuel circuit 117 leads through the electrically-controlled valve 120 and to the primary nozzle 253 of the fuel injector 250. The secondary fuel circuit 119 leads through the fuel scheduling function accomplished by the valve spool 111, and to the secondary nozzle 255 of the fuel injector 250.

Figure 4:
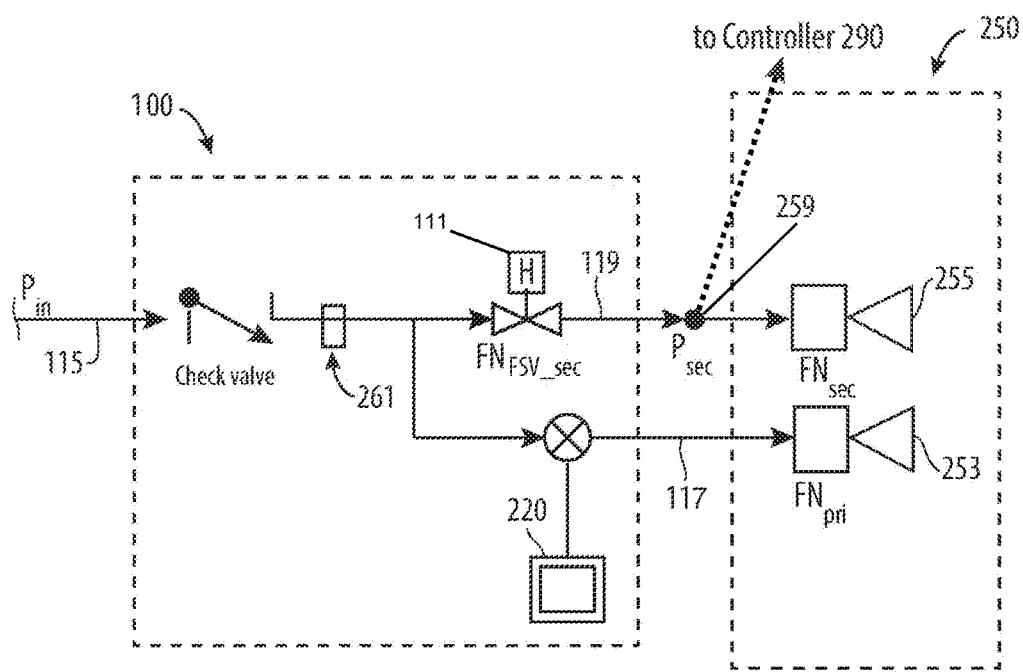
FIG. 4 is a schematic diagram of a valve arrangement of FIG. 1, showing a proportional valve in the primary fuel circuit.
Figure 5:
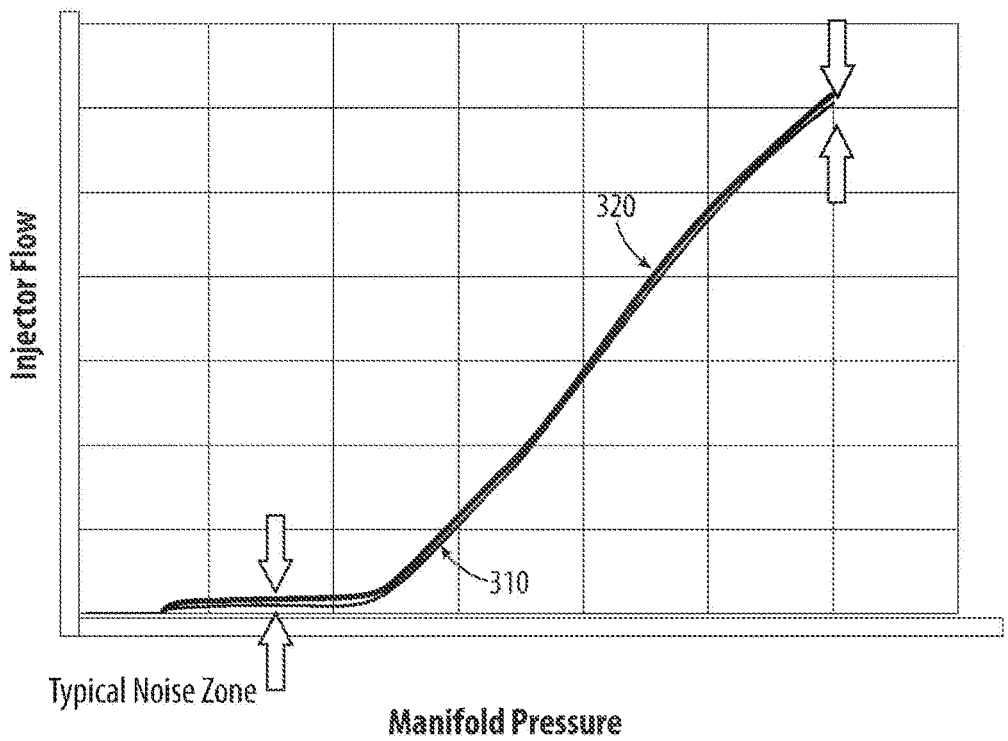
FIG. 5 is a graph of injector flow versus manifold pressure for a valve arrangement of FIG. 4, showing a first baseline, e.g. with the valve of the primary fuel circuit fully closed, showing a second baseline, e.g. with the valve of the primary fuel circuit fully open, and showing the area in between the first and second baselines, e.g. which is available with proportional control of a proportional valve of FIG. 4.

With reference now to FIG. 4, the electrically-controlled valve 120 is a discrete open/closed valve even if a modulating type valve is used, however it is also contemplated that it can instead be a proportional valve 220, with intermediate conditions between fully open and fully closed. The proportional valve 220 includes a proportional solenoid, a torque motor based servo valve, or a stepper motor. If a stepper motor is used, multiple discrete steps can be used between fully open and fully closed. The check valve 261 is upstream of the branch between the primary and secondary circuits 117 and 119, and a hydraulic valve, i.e. incorporating the valve spool 111 of FIG. 1 is in the secondary line 119 of the valve 100 for control of flow through the secondary circuit 119. Proportionally controlling the electrically controlled valve 220 between fully opened and fully closed states allows for intermediate flow states for fine tuning as needed to combustion conditions. FIG. 5 shows a graph of injector flow rate versus manifold pressure for the total flow through the injector from the fuel inlet 115. The first line 310 shows the flow response over a range of manifold pressures with the electrically-controlled valve 220 fully open, and the second line 320 shows the same but for the electrically-controlled valve 220 fully closed. Proportional control between fully closed and fully opened allows fine tuning of the flow at a given manifold pressure to the area between the two lines 310 and 320. The large arrows in FIG. 5 indicate the range of the typical noise zone, and the area between lines 310 and 320 extends over a considerable percentage of the typical noise zone. Proportional control within the area between the lines 310, 320, not just the on/off states of lines 310 and 320, can provide benefits including improved pull away, light around, noise mitigation, and injector to injector total flow profiling at maximum power to improve turbine life.

With continued reference to FIGS. 2 and 4, each of the injectors 250, including the passive injectors 240, can include a mass flow sensor 259 embedded in contact with fuel passing through the injector 250/240 operatively connected to the controller 290 to provide mass flow feedback to the controller. The sensor signals can be used to control actuators of the electrically-controlled valves 220 to gain more/less uniformity as desired during operation. The sensor 259 can include several devices in isolation or combination, such as a hot wire anemometer, a pitot tube, an ultrasonic transducer, an NIST (National Institute of Standards and Technology) type calibration orifice, a thermocouple, a pressure transducer, a turbine wheel, a Coriolis meter, a chemiluminescence sensor for sensing a signal from flame, or any other suitable type of sensor.

There are various potential benefits of systems and methods as disclosed herein. Among the benefits are that failure modes of the electrically-controlled valves 120 add little if any additional risk for operation of the injectors. Also, systems and methods as disclosed herein allow for removal of the engine flow divider valve and subsequent fuel manifolds, fittings, and the like, and allow both primary and secondary circuits to be supplied by a single manifold while still providing active control. With systems and methods as disclosed herein, failure of the electrically-controlled valve 120/220 results in limited flow to the primary circuit, not total loss of the primary circuit. Systems and methods as disclosed herein can allow for independent control of the primary circuit to mitigate acoustics, emissions or flame out. Multiple valves can work together as a system, e.g. if one valve is set to reduce flow, others can be opened to increase flow to compensate as the system adapts to stabilize conditions in the combustor. Incorporation of mass-flow sensor, pressure sensor(s), and/or position sensor allows for health monitoring, and for active flow control. Proportional control allows for valves to be gradually actuated to minimize potential pressure spikes within the fuel system. Tailoring flow proportionally between full state switch can improve operability of the engine, including ignition, pull away, and noise mitigations.

The methods and systems of the present disclosure, as described above and shown in the drawings, provide for adjustment of otherwise passive valves in fuel injection for gas turbine engines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A fuel injector for a turbine engine comprising:
   a housing having an internal enclosure for pressurized fluid;
   a fuel inlet formed on the housing, permitting delivery of fuel supply to the fuel injector;
   a scheduling valve disposed within the housing, configured for regulation of fuel flow from the fuel inlet in response to fuel pressure received at the fuel inlet;
   a primary fuel circuit formed in the housing, receiving fuel from the scheduling valve;
   a secondary fuel circuit formed in the housing, receiving fuel from the scheduling valve;
   an electrically-controlled valve in fluid communication with the primary circuit adapted and configured to actively control fuel through the primary circuit in response to a control signal;
   a fuel nozzle in fluid communication with and receiving fuel from the primary and secondary fuel circuits;
   a primary outlet formed on the nozzle, in fluid communication with the primary fuel circuit;
   a secondary outlet formed on the nozzle, in fluid communication with the secondary fuel circuit; and
   a leak path in connection with the primary fuel circuit, whereby fuel from the scheduling valve passes through the primary fuel circuit at a minimum predetermined rate when dictated by the scheduling valve, regardless of the operation of the electrically-controlled valve, wherein the leak path is a passage through the electrically-controlled valve that is always partially open.

2. The fuel injector of claim 1, wherein the electrically-controlled valve is a discrete open/closed valve.

3. The fuel injector of claim 1, wherein the electrically-controlled valve is a proportional valve with intermediate conditions between fully open and fully closed.

4. The fuel injector of claim 3, wherein the proportional valve includes a proportional solenoid or a stepper motor.

5. The fuel injector of claim 1, wherein the scheduling valve includes a valve spool, biased to a closed position by one or more biasing members, wherein the valve spool is configured to regulate flow from the inlet of the injector to each of the primary and secondary circuits, and wherein the valve spool includes a scheduling surface configured to vary flow area through the secondary circuit based on position of the valve spool within the scheduling valve.

6. The fuel injector of claim 1, wherein the leak path is defined by a default valve position of the electrically-controlled valve.

7. The fuel injector of claim 1, wherein activation of the electrically-controlled valve increases fluid flow through the primary fuel circuit.

8. The fuel injector of claim 7, wherein the electrically-controlled valve is a binary valve.

9. The fuel injector of claim 7, wherein the electrically-controlled valve is a modulating valve.

10. The fuel injector of claim 1, wherein the electrically-controlled valve is a motorized valve.

11. A fuel supply system for a turbine engine, comprising:
    a single fuel manifold adapted to receive and distribute a fuel supply to a plurality of points of the turbine engine; and
    a plurality of fuel injectors distributed around a periphery of the engine, adapted and configured to receive fuel from the single fuel manifold, at least one of the fuel injectors having:
    a housing having an internal enclosure for pressurized fluid;
    a fuel inlet formed on the housing, permitting delivery of fuel supply from the single fuel manifold to the fuel injector;
    a scheduling valve disposed within the housing, configured for regulation of fuel flow from the fuel inlet in response to fuel pressure received at the fuel inlet;
    a primary fuel circuit formed in the housing, receiving fuel from the scheduling valve;
    a secondary fuel circuit formed in the housing, receiving fuel from the scheduling valve;
    an electrically-controlled valve in fluid communication with the primary circuit adapted and configured to actively control fuel through the primary circuit in response to a control signal;
    a fuel nozzle in fluid communication with and receiving fuel from the primary and secondary fuel circuits;
    a primary outlet formed on the nozzle, in fluid communication with the primary fuel circuit;
    a secondary outlet formed on the nozzle, in fluid communication with the secondary fuel circuit; and
    a leak path in connection with the primary fuel circuit, whereby fuel from the scheduling valve passes through the primary fuel circuit at a minimum predetermined rate when dictated by the scheduling valve, regardless of the operation of the electrically-controlled valve, wherein the leak path is a bypass channel around or through the electrically-controlled valve.

12. The fuel supply system of claim 11, wherein the electrically-controlled valve is a discrete open/closed valve.

13. The fuel supply system of claim 11, wherein the electrically-controlled valve is a proportional valve with intermediate conditions between fully open and fully closed.

14. The fuel supply system of claim 13, wherein the proportional valve includes a proportional solenoid or a stepper motor.

15. The fuel supply system of claim 11, further comprising:
    at least one passive fuel injector, receiving fuel from the single fuel manifold.

16. The fuel supply system of claim 15, wherein the at least one passive fuel injector includes only one nozzle.

17. The fuel supply system of claim 11, further comprising:

a metering valve adapted and configured to receive a fuel supply from a fuel pump, and output the fuel to the single manifold.

18. The fuel supply system of claim 11, further comprising a controller electrically connected to the electrically-controlled valve on at least one fuel injector for individual control thereof.

19. The fuel supply system of claim 11, further comprising a controller electrically connected to each electrically-controlled valve on a plurality of fuel injectors for ganged control thereof.

20. The fuel supply system of claim 19, wherein each of the injectors in the plurality of fuel injectors includes a mass flow sensor operatively connected to the controller to provide mass flow feedback to the controller.

* * * * *